July 3, 1951
O. H. SCHUCK
2,559,094
GYRO ERECTION APPARATUS
Filed April 23, 1948
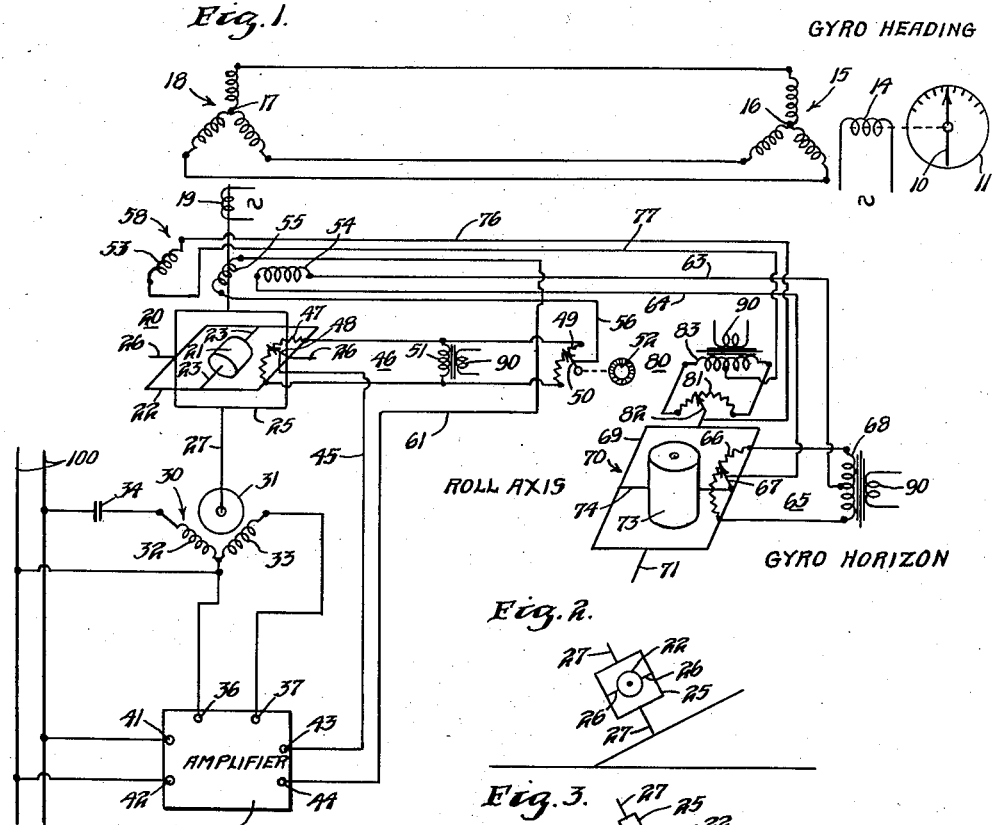
Inventor
OSCAR HUGO SCHUCK
By George H. Fisher
Attorney Patented July 3, 1951

2,559,094

UNITED STATES PATENT OFFICE 2,559,094

GYRO ERECTION APPARATUS

Oscar Hugo Schuck, Minneapolis, Minn., assignor to Minneapolis-Honeywell Regulator Company, Minneapolis, Minn., a corporation of Delaware Application April 23, 1948, Serial No. 22,757

21 Claims. (Cl. 74—5.34)

My invention is concerned with directional gyroscopes of the type which have their rotors arranged so that the spin axes of the rotors are at an angle to the vertical. Due to their inherent stability a gyroscope of this type when carried by a dirigible craft is responsive to changes in azimuth of such craft. Such gyroscope may be arranged so that its rotor rotates about a horizontal spin axis.

In order that such a gyroscope may have the desired stability and respond to changes in azimuth, it is generally provided with an arrangement termed an erecting device whereby the rotor of the gyroscope may be maintained perpendicular to the direction of the gravitational force of the earth. In order that the erecting means maintain the gyro rotor perpendicular to the gravitational force of the earth, such erecting means includes a gravitational responsive controller such for example as a mercury switch or other gravitational responsive device such as a pendulum.

Not only is the mercury switch or pendulum affected by the gravitational force of the earth but if the gyroscope is mounted on an aircraft, the switch or pendulum is also affected by centrifugal force which arises when the aircraft is turning. The resultant force acting on the gravitational responsive element is the resultant of the gravitational force exerted by the earth and the centrifugal force due to the aircraft turning. This resultant force is termed apparent gravity. The gravitational responsive element attempts to erect the gyroscope rotor so that it is perpendicular to the direction of the apparent gravity.

The rotor of the directional gyroscope is erected in many cases by applying a torque about the axis of the vertical gimbal ring of the gyroscope. If the torque be of sufficient magnitude so that the rotor is erected quickly thereby, the rotor may assume a position approximately perpendicular to the direction of apparent gravity.

If the aircraft is making a coordinated turn, with the bank of the aircraft properly proportioned for the rate of turn, the direction of apparent gravity will be, in most instances, perpendicular to the floor of the aircraft. If the rotor of the gyroscope as controlled by the gravitational responsive element be erected quickly, it will assume a position perpendicular to the direction of apparent gravity or therefore parallel to the floor of the aircraft.

When the gyroscope rotor is thus erected, it has been noted that the change in azimuth undergone by the turning aircraft and indicated by the directional gyroscope is not in accordance with the actual change in azimuth of the aircraft. I have discovered that the difference between the indicated and actual change in azimuth of the aircraft is due to the fact that the gyroscope rotor is being erected approximately perpendicular to the direction of apparent gravity. I have also discovered why erecting the gyro rotor perpendicular to the direction of apparent gravity results in a difference between the indicated and actual change of heading of the aircraft. The cause of this difference will be explained later.

Assume that the rotor of a directional gyroscope is parallel with the fore and aft or longitudinal axis of the aircraft. Assume further that the aircraft is to execute a 90 degree turn to the left with the proper bank angle suited to the rate of turn selected. After the 90 degree turn has been completed the rotor axis is perpendicular to the longitudinal axis of the aircraft but as controlled by a gravitational erecting means the rotor axis is also parallel to the floor of the aircraft when the gyro is subject to a high precession rate.

While the aircraft is executing the turn of 90 degrees, the directional gyro rotor is being erected with respect to the apparent vertical about an axis that is inclined since the aircraft is banked. The total angular displacement of the rotor while it is being erected perpendicular to the apparent vertical has a horizontal as well as a vertical component. This horizontal component is in the direction of the change in azimuth. Since changes in azimuth of the aircraft with respect to the gyroscope rotor are measured in a horizontal plane and since the rotor axis has a horizontal component of movement while being erected in the direction of the turn, a discrepancy will arise as the gyroscope will indicate a change in azimuth or an extent of turn which is less than the actual change in heading. Such discrepancy is undesirable, for accurate indication of the change in azimuth of the craft is necessary.

It is an object therefore of my invention to provide a correct indication of the change in azimuth of a dirigible craft by improving the erecting means for a directional gyroscope.

It is a further object of my invention to provide a control for the erecting means of a directional gyroscope by other than gravitational responsive elements.

It is a further object of my invention to control the erecting means of a directional gyroscope so that the gyroscope rotor axis is erected to remain in a plane which may be perpendicular to the direction of true gravity.

It is a further object of my invention to control the erecting means for a gyroscope in accordance with the changes in the angle of bank of the craft on which such gyroscope may be mounted and also in accordance with the pitch angle of the aircraft as determined by a second gyroscope in each instance and also in accordance with the changes in azimuth of the aircraft.

It is a further object of my invention to provide a controller for the erecting means of the gyroscope which controller is unaffected by centrifugal force or lateral accelerations.

It is a further object of my invention to provide an erecting means for the rotor of a directional gyroscope with a controller which is unaffected by linear acceleration of the aircraft.

It is a further object of my invention also to provide a proportional follow up control of the erecting means for the rotor of a directional gyroscope which follow up means is carried by the gyroscope.

A further object of my invention is to provide manual means for selecting the plane to which the rotor of a directional gyroscope will be erected.

These and further objects of my invention and advantages of my arrangement will become apparent upon reading of the accompanying description in conjunction with the drawing disclosing a preferred embodiment thereof.

Referring to the drawing:

Figure 1 is a diagram of my improved erecting means for a directional gyroscope rotor.

Figure 2 shows the gyro rotor as it is parallel to the fore and aft axis of the aircraft at the beginning of a banked turn.

Figure 3 shows the position of the gyro rotor as erected by my improved means after the aircraft has turned 90°.

Figure 4 shows a control element in the form of a gravitationally responsive mercury switch mounted on the gyro for controlling an existing rotor erecting means arrangement.

Figure 5 shows the mercury switch of Figure 4 in relation to the erecting means.

Figure 6 shows the aircraft in the same relative position as in Figure 3 but with the gyro rotor in the existing arrangement approximately parallel to the floor of the aircraft.

In Figure 1, I have illustrated my invention as applied to apparatus which may be mounted in an aircraft for indicating changes in azimuth of the aircraft. The indication of the change in azimuth of the aircraft on which the apparatus is mounted is obtained from the position of a pointer 10 which coacts with a dial 11 provided with suitable indicia. The pointer 10 is carried by a shaft which is driven by rotor 14 of a synchro receiver 15. The stator windings 16 of receiver 15 are connected to corresponding stator windings 17 of a synchro transmitter 18. The transmitter 18 has its rotor 19 supported on the axis of an outer gimbal ring 25 of a directional gyro 20. The rotors 14 and 19 are connected to a source of alternating current. When the aircraft changes its heading in azimuth, the rotor winding 19 does not turn with the aircraft but is maintained in space by the gyro 20. The stator winding 17 being carried by the aircraft is moved with respect to the rotor 19 whereby the relative positions of rotors 19 and 14 with respect to their stator windings 17 and 16 respectively is altered. This change in the relative positions as is well known causes a torque to be applied to the rotor 14 and consequently to the pointer 10 until the rotors 19 and 14 are again in the same relative positions with respect to their stators. The new position taken by the stator 17 with respect to the rotor 19 is the same as the change in azimuth made by the aircraft. This change in position of the stator 17 with respect to rotor 19 is reflected in the movement of pointer 10 with respect to dial 11. The pointer 10 and dial 11 therefore indicate the change in heading of the aircraft with respect to the gyro 20. Since the heading of the aircraft is considered with respect to the gyro 20 the indicator comprising pointer 10 and dial 11 will indicate gyro heading or the heading of the aircraft with respect to the gyro.

While I have illustrated the directional gyro as a free gyro, it is understood that the gyro 20 may also be slaved by a magnetic compass, a cathode ray compass, or an inductor compass in which case the indicator would indicate magnetic heading of the aircraft. In other words, the indicator would indicate the direction of the aircraft with respect to magnetic north. Apparatus in which the gyro may be slaved by a compass of the cathode ray type is illustrated by the application of Robert J. Kutzler Serial No. 22,841 filed of even date herewith. Further, while I have illustrated the directional gyro 20 as merely controlling an indicator for indicating the direction of the aircraft with respect to the gyro heading, it is understood that such directional gyro may also constitute a portion of an automatic pilot such as the directional gyro in the aforesaid application of Robert J. Kutzler.

The directional gyro 20 comprises a rotor 21 having a spin axis 23, 23 carried by an inner gimbal ring 22. Suitable means, not shown, are provided for rotating the rotor 21. The inner gimbal ring 22 is supported in the vertical outer gimbal ring 25 on an axis 26, 26 which is at right angles to the spin axis 23, 23 of the rotor 21. Trunnions 27, 27 extending from the outer gimbal ring 25 are supported on suitable bearings not shown but supported by the gyroscope frame.

When the aircraft changes its heading in azimuth as stated, the bearings and frame, not shown, which support the trunnions 27 of the outer gimbal ring 25 are carried around with the aircraft whereas the trunnions 27 are held against rotation due to the stability of the gyro rotor 21. A slight friction may develop between the trunnions 27 and their supporting bearings which applies a torque about the trunnions 27. Such torque when applied about the axis of trunnions 27 results in the well known precession of the gyro rotor 21 about the axis 26, 26 of the inner gimbal ring 22. If this torque is permitted to operate unopposed, it eventually would result in the rotor 21 precessing about the axis 26, 26 until the spin axis 23, 23 is aligned with the axis of trunnions 27, 27. Under such circumstances the gyro 20 would be unresponsive to changes in azimuth that the aircraft might be making. In order to prevent the gyro rotor 21 from precessing, as stated, means have been provided to apply a torque about the lower trunnion 27 to maintain the plane of the inner gimbal ring 22 in a selected relationship with the plane of the outer gimbal ring 25.

A motor 30 is associated with the lower trunnion 27 of the outer gimbal ring 25 to apply a torque to the lower trunnion whereby the gyro rotor 21 may be caused to precess about the axis 26, 26 to maintain the planes of the inner gimbal ring 22 and the outer gimbal 25 in the desired relation. While there are any number of motors which may be associated with the lower trunnion 27 to precess the rotor 21, we have shown the motor 30 as a capacitor type induction motor. The motor 30 has an armature or rotor 31 carried by the lower trunnion 27. The rotor 31 is inductively associated with two field windings 32, 33 which supply a rotating two-phase field in the well known manner. The winding 32 is connected across a supply line 100 in series with a phase shifting capacitor 34. The line 100 may be supplied by an inverter, not shown, or other suitable supply means carried by the aircraft. The other motor winding 33 is connected through suitable leads to the output terminals 36, 37 of an amplifier 40. Power input terminals 41, 42 of amplifier 40 are connected to the line 100 by suitable leads. Terminals 43 and 44 are the signal input terminals of amplifier 40. The direction of rotation of the motor 30 depends upon the phase relationship between the input signal applied to amplifier terminals 43 and 44 and the voltage across the winding 32 of motor 30. The arrangement of the induction motor and amplifier is not new, the arrangement being similar to the amplifier motor arrangement disclosed in the patent to Taylor 2,388,350, for example.

The input terminals 43, 44 are connected to a control circuit which extends from amplifier terminal 43, lead 45, rotor tilt-manual centering variable impedance network 46, lead 56, resolver 58, lead 61, to amplifier terminal 44.

The impedance network 46 includes a directional gyro rotor tilt potentiometer having a resistor 47 and a wiper 48 coacting with the resistor and a manually operable centering potentiometer consisting of a resistor 49 and an adjustable wiper 50. The resistor 47 is supported in concentric relation to axis 26 in insulated relation by the inner gimbal ring 22 of gyro 20. The resistor 47 is connected across a secondary winding 51 of a transformer having a primary winding 90. The wiper 48 is carried in contact relation to resistor 47 by the vertical gimbal ring 25 but in insulated relation to said ring. The lead 45 extending from the input terminal 43 of amplifier 40 is connected to the wiper 48. The resistor 47 is moved with respect to the wiper 48 upon relative movement of the inner gimbal ring 22 with respect to the outer gimbal ring 25 of the directional gyro 20. The resistor 49 of the centering potentiometer is connected in parallel to resistor 47 across the ends of secondary winding 51. The wiper 50 may be adjusted over the surface of resistor 49 by a manually operable centering knob 52.

The resolver 58 comprises two primary or energizing windings 53, 54 and a secondary winding or induction coil 55, all lying in a horizontal plane. The windings 53, 54 are arranged at right angles to each other and are inductively associated with the secondary winding 55. The voltage induced in coil 55 by winding 54 varies with the voltage in coil 54 and the sine of the angle of azimuth. The voltage induced in coil 55 by winding 53 varies with the voltage in coil 53 and the cosine of the angle of azimuth or gyro heading. Lead 56 extends from the wiper 50 to one end of the inductive coil 55 of resolver 58. The opposite end of induction coil 55 is connected through lead 61 to the other input terminal 44 of amplifier 40. The induction coil 55 is supported by the upper trunnion 27 of directional gyro 20.

The energizing coil 54 is connected by means of leads 63 and 64 to a vertical gyro roll axis variable impedance network 65. The impedance network 65 includes a vertical gyro roll axis potentiometer having a resistor 66 and a wiper 67. The resistor 66 is connected across the ends of a secondary winding 68 of a transformer to complete the network. Since the networks of the arrangement may have their secondary windings coupled to a common primary winding, the primary winding 90 is also indicated as associated with the secondary winding 68. Lead 63 extends from one end of energizing coil 54 to a center tap of secondary winding 68 and lead 64 extends from the other end of energizing coil 54 to the wiper 67 of the roll axis potentiometer. The resistor 66 is carried in insulated relation by the outer gimbal ring of a vertical gyro 70. The outer gimbal ring 69 of the vertical gyro 70 is supported on an axis 71, 71 in a position transverse to the aircraft. An inner gimbal ring 73 which is illustrated as a rotor casing is supported on an axis 74 at right angles to axis 71, 71. The vertical gyro 70 may be of the conventional type having erecting means not shown and further has a rotor rotatably carried in the casing 73 and driven by suitable means not shown. Upon movement of the aircraft about its longitudinal or fore and aft axis the outer gimbal ring 69 rotates with respect to the casing 73 which is stabilized by the rotor supported by it. The wiper 67 of the roll axis potentiometer is supported on the axis 74 concentric to resistor 66 and it is therefore evident that when the aircraft tilts about its longitudinal or roll axis that the resistor 66 is moved with respect to the wiper 67.

The primary winding 53 of resolver 58 is associated with a variable impedance network 80. The network 80 includes a vertical gyro pitch axis potentiometer having a resistor 81 and a wiper 82 adjustable thereover. The resistor 81 to complete the network is connected across the opposite ends of a secondary winding 83 of a transformer having a primary winding 90. Resistor 81 may be mounted on the fixed part of the gyro frame not shown and the wiper 82 is carried in concentric relation to resistor 81 on the axis 71 of the vertical gyro 70. The axis 71 is parallel to the lateral axis of the aircraft and it is thus seen that when the aircraft tilts about its pitch or lateral axis that the resistor 81 moves with respect to the wiper 82. A conductor 76 extends from the wiper 82 to one end of the primary winding 53 of resolver 58. A conductor 77 extends from a center tap of secondary winding 83 to the other end of primary winding 53.

In Figure 4 there is shown the directional gyro 20 with the directional gyro rotor pitch potentiometer consisting of resistor 47 and wiper 48 replaced by a mercury switch 101. The mercury switch 101 is the control element for an existing erecting means for the directional gyro rotor. The mercury switch 101, as well known in the art, is acted upon by gravity to maintain the rotor 21 perpendicular to gravity or, in general, parallel to the surface of the earth.

In Figure 5 there is shown the mercury switch 101 with its associated erecting means for the directional gyro 20. The parts of the directional gyro which have been unaltered are indicated as in Figure 1. A capacitor type motor 102 provides the torque about the vertical trunnion 27 to erect the gyro rotor 21, Figure 1 to a position perpendicular to the direction of gravity. It will be seen from Figure 5 that when the mercury switch 101 is tilted toward the left that a secondary winding 105 of a transformer has winding 103 of the motor 102 connected directly across it but that the motor winding 104 is connected in series with a phase shifting condenser 106 across the secondary winding 105. The rotating field set up by the windings 103 and 104 causes a torque to be applied to the rotor 31 and to the directional gyro in one direction. When the mercury switch 101 is tilted toward the right, the winding 104 of motor 102 is connected directly across the secondary winding 105, whereas the winding 103 is connected in series with the capacitor 106 and across the secondary winding 105 whereby a torque is applied to the rotor 31 and to the directional gyro in a direction opposite to that provided when the switch 101 is tilted to the left.

Figure 6 illustrates how the inner gimbal ring 22, represented as the gyro casing 22, is erected approximately parallel to the floor of the aircraft when the erection means is controlled by a gravitational responsive device such as the mercury switch 101.

The position assumed by the inner gimbal ring 22, shown in Figure 6, is illustrative of the action of a gravitational controlled erecting means after the aircraft has executed a turn of 90° while banked. The gyro is assumed as being positioned in the banked aircraft at the start of the turn, as indicated in Figure 2. After the aircraft has turned 90° the axis 23 of the gyro rotor 21 is transverse to the aircraft. The mercury switch 101 is mounted parallel to the axis 23 so it to is transverse to the aircraft. The mercury within the mercury switch 101 is acted upon by centrifugal force acting toward the outer end of the switch 101 which conforms with the direction that the aircraft is turning. The mercury within switch 101 is therefore acted upon not only by the earth's gravitational force but also by the centrifugal force due to the turn and as a result, causes the inner gimbal ring 22 to be erected perpendicular to the apparent gravity which acts on the mercury switch 101. As stated previously, in a coordinated turn apparent gravity is perpendicular to the floor of the aircraft and since the gimbal ring 22 is erected perpendicular to apparent gravity it is erected parallel to the floor of the aircraft. It has been stated how as thus erected parallel to the floor of the aircraft the directional gyro tends to indicate a change in azimuth less than the actual change of azimuth which the plane has undergone.

My improved erecting system includes erection control devices which are supported on neutrally mounted gyroscopes so that they are not responsive to linear or angular accelerations. Consequently my improved erecting apparatus for a directional gyro does not cause the heading indicator to incur the discrepancy which is present in a directional gyro provided with erecting means controlled by a gravitational responsive device. The manner in which my improved gyro erection means maintains a rotor in a desired position will be evident from the following description of its operation.

Operation

The apparatus above described which embodies my invention may function to maintain the rotor 21 of the directional gyro 20 approximately perpendicular to the direction of true gravity and is unaffected by linear or angular accelerations. Assume the aircraft is to change heading while it is banked but with the longitudinal axis of the aircraft horizontal. With the longitudinal axis horizontal, wiper 82 of the vertical gyro pitch potentiometer will be at the same potential as the center tap of secondary winding 83 and network 86 will not apply a voltage to primary 53 of resolver 53. The axis of rotor 21 under these conditions will be approximately perpendicular to the direction of true gravity when the angle between the axis 23, 23 of rotor 21 and the floor of the aircraft is equal to the product of the bank angle of the aircraft and the sine of the angular change in azimuth of the aircraft.

As a preliminary, the rotor is properly positioned. When the aircraft is not tilted about either its pitch or roll axis, wiper 82 of the vertical pitch potentiometer is at the same potential as the center tap of secondary 83, the wiper 67 of the roll axis potentiometer is at the electrical center of resistor 66 and is at the same potential as the center tap of secondary winding 68. In addition, with the craft on zero gyro heading the induction coil 55 is at right angles to the energizing coil 54 and parallel to winding 53. The wiper 48 of the directional gyro tilt potentiometer is at the electrical center of resistor 47 and the wiper 50 of the manually operable centering potentiometer is at the electrical center of resistor 49 at which time there will be no difference of potential between the wipers 48 and 50. There will thus be no signal voltage applied to the input terminals 43, 44 of amplifier 40. The directional gyro rotor at the start of the turn to be considered has its axis 23, 23 parallel to the direction of the longitudinal or fore and aft axis of the aircraft; but after 90 degrees of the turn is completed, axis 23, 23 is parallel to the pitch potentiometer axis as shown in Figure 1.

If the directional gyro rotor be tilted and not parallel to the longitudinal axis of the aircraft, the centering wiper 50 may be adjusted by means of manual control knob 52 to displace wiper 50 with respect to the center of resistor 49. The wiper 50 will be at a different potential than wiper 48 and consequently a signal will be applied to the amplifier 40 causing the motor 30 to apply a torque about the vertical axis of the directional gyro 20 thereby resulting in the precession of the rotor 21 about the axis 26, 26 until the voltage between wipers 48 and 50 is reduced to zero. The rotor is thus positioned as desired.

Should the gyro subsequently tilt about axis 26, 26 so that there is a relative movement between the inner gimbal ring 23 and the outer gimbal ring 25, the resistor 47 will be moved with respect to wiper 48 setting up a signal on the amplifier 40 to energize the precessing motor 30 so that the gyro rotor 21 precesses about the axis 26, 26 to restore the inner ring 22 to its normal position with respect to the outer ring 25. Such operation takes effect when the aircraft is on straight and level flight.

As stated, the angle between the gyro rotor axis 23, 23 and the floor of the aircraft while the aircraft is turning with its roll axis horizontal is to be made equal to the product of the bank angle and the sine of the change in azimuth of the aircraft. The roll axis potentiometer of the vertical gyro 70 consisting of resistor 66 and wiper 67 generates a signal in proportion to the angle of bank and this signal is applied to the energizing coil 54 when the craft banks. If the craft is changing its heading in azimuth the coil 55 has a relative movement with respect to the energizing coil 54 whereby a voltage is induced in the induction coil 55 proportional to the bank angle voltage and the sine of the change in azimuth. The angular movement of the inner gimbal ring 22 with respect to the outer gimbal ring 25 of gyro 20 will be equal to the angle which the rotor axis 23, 23 makes with the floor of the aircraft. The wiper 48 and resistor 47 provide a signal proportional to the relative movement of the outer gimbal ring 25 with respect to the inner gimbal ring 22 and therefore provide a signal proportional to the angle between the axis 23, 23 of rotor 21 and the floor of the aircraft. By opposing the signal from wiper 48 and resistor 47 to the voltage now being set up in induction coil 55, the amplifier input circuit will be balanced when these voltages are equal. When the voltages are thus equal the gyro rotor axis 23, 23 will be at the correct angle with respect to the floor of the aircraft.

It is thus evident that as long as the aircraft is level or does not change its heading in azimuth that the gyro rotor 21 has its axis 23, 23 maintained parallel to the floor of the aircraft. In Figure 2 the gyro is shown with its axis 23 parallel to the longitudinal axis of the aircraft. When the aircraft is merely banked, as indicated by the position of the gyro in Figure 2, the induction coil 55 is at right angles to the energizing coil 54 so that no voltage is induced in coil 55 despite the energization of the coil 54 from the vertical gyro roll axis potentiometer. The gyro rotor 21 in Figure 2 remains parallel to the floor of the aircraft as long as there is no relative turning of the aircraft with respect to trunnions 27, 27.

In Figure 3 the aircraft is considered to have made a turn of 90° toward the left while banked. Since the vertical gyro banking potentiometer has energized coil 54 and since the pickup coil 55 has rotated with respect to energizing coil 54, a voltage is induced in the induction coil 55. The voltage induced in coil 55 is the reference voltage and if not balanced it effects the operation of amplifier 40 which causes the torque motor 30 to precess the gyro about axis 26, 26 thereby displacing the inner gimbal ring 22 with respect to the outer gimbal ring 25 and to displace the resistor 47 with respect to the wiper 48 a like amount. The gyro rotor 21 precesses until the signal obtained by the movement of resistor 47 with respect to 48 is equal and opposite to the voltage induced in coil 55 at which time the input circuit to amplifier 40 will be balanced and the torque motor 30 will no longer operate. At this time the rotor assumes a position, as shown in Figure 3, which is perpendicular to the direction of the true gravity.

In the operation of my apparatus during the 90° change in azimuth to the left while in a banked turn, as indicated in Figures 2 and 3, the gyro rotor 21 ordinarily is actually not precessed unless its axis is no longer in the plane originally determined by axes 26 and 23. The gyro rotor, due to its stability, maintains its direction in space and the signal provided by the induction coil 55 balances the signal obtained from the directional gyro potentiometer due to the relative tilt of the inner gimbal ring 22 with respect to the outer ring 25. The signals, unless drift occurs, constantly offset and balance one another during the turn.

While the apparatus, as stated, may be set up with the rotor 21 parallel to the floor of the aircraft when the aircraft is unbanked and when it is on zero azimuth, the relationship of the gyro axis 23, 23 with respect to the floor of the aircraft may be altered by the operation of the manual control knob 52. The operation of the manual control knob 52 may be made in such direction as to set up a signal between wipers 50 and 48 to vary the position of the gyro with respect to the floor of the aircraft. The difference of potential between the wipers 50 and 48 being applied to the amplifier 40 causes the operation of torque motor 30 to precess the gyro until the wiper 48 assumes a position on resistor 47 where its potential is the same as that of wiper 50.

While I have described the operation of my improved erecting means for a directional gyroscope while the aircraft is making a banked turn with the roll axis in a horizontal position at all times, it is evident that these conditions illustrate a special case. In general, when an aircraft is making a bank turn the aircraft tends to change attitude about its lateral axis. The tilting of the aircraft about the lateral axis while in a banked turn illustrates a general case or conditions generally encountered.

In order that my improved erecting means may also provide proper erection of the directional gyro rotor for the general conditions encountered, the network 80 is provided.

The operation during the general conditions encountered will be considered.

Let it be assumed that the aircraft is on zero gyro heading and is in a level position. The rotor 21 of the directional gyro is assumed in the desired plane in which it is to be maintained. The input circuit to amplifier 40 is assumed in balanced condition.

If the aircraft tilts about the lateral or pitch axis while on zero gyro heading, the inner gimbal ring 22 moves resistor 47 with respect to the wiper 48 carried by the outer gimbal 25. A signal is thus derived from the directional gyro tilt potentiometer. However, since the aircraft has tilted about its pitch axis, vertical gyro 70 also responds to the movements of the aircraft and moves the wiper 82 with respect to the resistor 81 to derive a signal which is applied to primary winding 53 of resolver 58. On zero gyro heading the secondary winding 55 is parallel to the primary winding 53. The full signal applied to primary 53 is induced in secondary winding 55 in opposed relation to the signal obtained from the directional gyro tilt potentiometer and the two signals are equal and opposite so that the amplifier 40 does not operate. Therefore, unless internal forces affect the gyro 20, the rotor 21 maintains the original plane in which it was positioned. Movement of the aircraft about the pitch axis therefore does not change the original plane of position of rotor 21.

Assume now that the aircraft has changed heading 90° and is in a straight and level position. The rotor 21 is now transverse to the aircraft instead of being parallel with the longitudinal axis of the aircraft. If the aircraft tilts about the pitch axis the wiper 48 does not move with respect to resistor 47. The secondary coil 55 is now at right angles to the primary winding 53. Although the vertical gyro pitch potentiometer due to the movement of wiper 82 with respect to resistor 81 derives a signal yet due to the relatively perpendicular positions of primary winding 53 and secondary winding 55, no signal is applied to the amplifier 40.

With the plane on 90° gyro heading and in straight and level flight, should the aircraft tilt about the roll axis, the resistor 47 is moved with respect to the wiper 48. However, the vertical gyro roll axis potentiometer derives a signal due to the relative movement of the resistor 66 and wiper 67 which is applied to the primary winding 54 of resolver 58. On 90° gyro heading the secondary winding 55 of resolver 58 is parallel to the primary winding 54 and the voltage obtained from the vertical gyro roll axis potentiometer is induced in the secondary winding 55. This voltage induced in secondary winding 55 is equal and opposite to the voltage obtained from the directional gyro tilt potentiometer and the amplifier 40 does not operate.

It is now evident that when the aircraft is on zero gyro heading that movements of the aircraft about the roll axis do not cause relative movement of the inner gimbal ring 22 and the outer gimbal ring 25. Also when the aircraft is on zero gyro heading movement of the aircraft about the lateral or pitch axis resulting in the relative movement of inner gimbal ring and outer gimbal ring 25 to derive a signal from the directional gyro tilt potentiometer has an effect which is counterbalanced or opposed by the operation of the vertical gyro pitch potentiometer.

Further, it is evident that when the aircraft is on 90° gyro heading movement of the aircraft about the pitch axis does not alter the relative positions of inner gimbal ring 22 and outer gimbal ring 25. Also movement of the aircraft about the roll axis to alter the position of inner gimbal ring 22 with respect to outer gimbal ring 25 to derive a signal from the directional gyro tilt potentiometer is offset by a signal obtained from the vertical gyro roll axis potentiometer which is equal and opposite to the signal from the directional gyro tilt potentiometer.

When the aircraft makes a banked turn from zero gyro heading and at the same time incurs a change of attitude with respect to the pitch axis, the signals from the vertical gyro pitch axis potentiometer and the vertical gyro roll axis potentiometer are modified in the resolver 58 in accordance with the trigonometrical functions of the cosine and sine of the angular change in azimuth respectively. The vertical gyro pitch axis potentiometer applies a maximum signal through the resolver to the input circuit of amplifier 40 to compensate for changes in position of the aircraft about the pitch axis on zero gyro heading but this value of the compensating signal from the vertical gyro pitch potentiometer decreases with increase in angular change until it is zero for 90° of heading of the aircraft with respect to the gyro. Similarly, the roll axis potentiometer of the vertical gyro provides a compensating signal in the input circuit of amplifier 40 which is a minimum when the aircraft is on zero gyro heading but is a maximum when the aircraft is on 90° gyro heading. The compensating signals from the vertical gyro pitch axis potentiometer and the vertical gyro roll axis potentiometer as applied through the resolver 58 to the input circuit of amplifier 40 compensates for the signal derived from the directional gyro tilt potentiometer due to the relative movement of the inner gimbal ring with respect to the outer gimbal ring due to the stability of the gyro rotor 21 or for other causes as the aircraft changes its position about the pitch axis or the roll axis while the aircraft is turning.

It is now evident that I have provided an erecting means for a directional gyro that maintains the gyro axis in a desired plane. It is further evident that my erecting means is not affected by apparent gravity; consequently the plane in which the rotor axis is to be maintained is not altered by the presence of apparent gravity. Further that because my erecting means is not affected by apparent gravity the directional gyro which is provided with my erecting means indicates a change of azimuth that corresponds with the actual change of azimuth of the aircraft on which my apparatus is mounted.

Although I have described my invention as it is embodied in one form I do not expressly limit my invention to the particular arrangement described but consider such limits as being defined by the accompanying claims.

I claim as my invention:

1. An arrangement for maintaining a rotor of a directional gyroscope in a predetermined position comprising: a vertical gyroscope; a first means responsive to the tilt of the vertical gyroscope about an axis; a second means adapted to respond to movement of the directional gyroscope about its azimuth axis; a third means controlled by the change of position of the directional gyroscope rotor about a second axis; and motor means controlled by said first, second and third means for moving said gyroscope rotor about said second axis.

2. In combination: a directional gyroscope with a rotor movable about two axes other than its spin axis; a first means for generating a signal upon relative movement of said rotor about one of said two axes; a second means operable upon relative movement of said rotor about the second of said two axes; a vertical gyroscope; a third means for generating a signal upon relative movement of the vertical gyroscope about one axis; and means connected to said first, second and third means for controlling said rotor about said second axis.

3. In combination: a directional gyroscope having a rotor mounted in a universal movement support, whereby said rotor may be moved about two axes at an angle with each other in addition to movement about its spin axis one axis being always perpendicular to said spin axis; a signal generating means responsive to the movement of the rotor about said one of said two axes; manual means for generating a signal; means responsive to said signals; and means controlled by said responsive means for exerting a force on said gyroscope about the other of said two axes.

4. A directional gyroscope having a rotor mounted in a universal movement support for motion about two axes other than its spin axis; means responsive to relative movement of the rotor about one of said two axes for indicating changes in azimuth; means for maintaining a selected position of said rotor about said second axis including torque applying means; and manual means for controlling said torque applying means to alter the position of said rotor about said second axis.

5. A directional gyroscope having a rotor mounted in a universal movement support for motion about two axes other than its spin axis one of said two axes being always perpendicular to said spin axis; control means effective upon movement of said rotor from a normal position about said one of said two axes for applying a torque about said second of said two axes; and manually operable means for varying the position of said rotor at which said control means is effective to thereby vary the normal position of said rotor about said first axis.

6. A gyroscope having a vertical axis of precession and a rotor mounted in a universal movement support for movement about said vertical axis and an additional axis other than its spin axis; means including signal generating means supported on said gyroscope and effective upon movement of said rotor from a normal position about said additional axis for applying a torque to said gyroscope about the vertical axis; and manual means for generating a signal for controlling said torque applying means to alter the normal position of said rotor about said additional axis.

7. A directional gyroscope having a rotor mounted in a universal support, comprising an inner gimbal and an outer vertical gimbal, for movement about two axes other than its spin axis; means carried by said gyroscope for generating an alternating voltage signal proportional to the tilt of said rotor from a normal position about one of said two axes; two phase motor means for applying a torque about the other of said two axes; means connected to said signal generating means and controlling one phase of said torque applying means said other phase being connected to a continuous source of alternating voltage; and manual means for altering the normal position of said rotor at which said means carried by the gyro generates a signal.

8. A directional gyroscope having a rotor with three degrees of freedom of rotation; means carried by said directional gyro for generating a first signal upon tilt of the rotor about one axis; transformer means having a fixed part and a part operated upon movement of the gyro about a second axis; a vertical gyro; means for generating a second signal upon tilt of the vertical gyro about one axis; means for applying said second signal to said operated part; means connecting said first signal generating means and said operated part for combining said signals; and means controlled by said combining means for applying a torque about the second axis of said directional gyro.

9. In a directional gyro adapted for mounting on an aircraft and responsive to change in position of the craft about an axis in azimuth and having means for indicating said changes in azimuth, in combination: means for generating a first signal in proportion to the movements of the gyro rotor from a normal position about an axis perpendicular to said azimuth axis; means for generating a second signal upon movement of the craft about another one of its axes; means for deriving a third signal which is a function of the changes in azimuth and of said second signal; and means for applying a torque about the axis of the gyro responsive to the change in azimuth and controlled by said first signal generating means and third signal deriving means.

10. In apparatus for an aircraft which craft may bank as it changes heading in azimuth and comprising a directional gyroscope having three degrees of freedom and movable relatively to said craft about one axis in response to changes in heading and adapted for indicating changes in heading; in combination: means carried by said gyroscope for supplying a first signal upon tilting of the gyro rotor about a second axis from a normal position; means responsive to the banking of the craft for supplying a second signal; means connected to said gyroscope and to said second signal supplying means for supplying a third signal in response to said second signal and to movement of said gyro about said one axis; and means controlled by said first and third signal supplying means for applying a torque to said gyro about said one axis.

11. A directional gyroscope having three degrees of freedom whose rotor axis is at an angle to the direction of gravity and relatively movable with respect to its support about a second axis in response to changes in heading of said support; means carried by said gyro for supplying a first signal upon tilting of the gyro rotor about a third axis from a normal position; means responsive to the banking of the craft for supplying a second signal; means connected to said bank responsive means and said directional gyroscope for supplying a third signal in response to said second signal and movement of said gyro about said second axis; manual means for generating a fourth signal; and means controlled by said first, third and fourth signals for applying a torque to said gyro about said second axis.

12. A directional gyroscope having an inner gimbal ring for rotatably supporting a rotor and an outer pivoted gimbal ring pivotally supporting said inner ring; reversible phase alternating current signal generating means comprising a part carried by said inner ring and a part carried by said outer ring to supply a signal upon relative movement of said inner and outer rings proportional to said relative movement; motor means connected to said generating means and to a continuous alternating current source said motor means including means to apply a torque about the axis of the outer gimbal ring whereby said inner and outer rings are maintained in a desired relation.

13. A gyroscope having a rotor mounted on a gimbal support for movement about one axis which is perpendicular to the rotor spin axis; potentiometer means for deriving a signal upon movement of said rotor about said one axis from a normal position; motor means adapted to move said rotor; manual operated potentiometer means for deriving a signal; and means for combining said potentiometer signals and controlling said motor means.

14. A vertical gyroscope; means responsive to the tilt of said gyroscope about one horizontal axis for deriving a signal proportional to said tilt; a directional gyroscope having means responsive to changes in azimuth; means controlled by said deriving means and said directional gyro for deriving a control signal which is a function of the product of said tilt signal and a function of said change in azimuth; means for applying a torque to said directional gyro to cause movement of its rotor about a horizontal axis; means for deriving a further signal proportional to said movement; and means for combining said control signal and said further signal and controlling said torque applying means.

15. A directional gyroscope having a rotor with three angular degrees of freedom; a first signal generator responsive to the tilt of the gyro rotor about one axis from a normal position; a vertical gyro having a rotor with three angular degrees of freedom; a second signal generator responsive to the tilt of the vertical gyro rotor about one axis; a third signal generator responsive to the tilt of the vertical gyro rotor about a second axis; resolving means connected to said second and third signal generators and energized by said second and third signals to provide a fourth signal and means controlled by said first and fourth signals for precessing said rotor to a desired position.

16. A directional gyroscope having a rotor supported for universal movement; a first means for deriving an electrical signal in accordance with the relative tilt of the rotor and its support about one axis; a vertical gyro supported for universal movement; a second means for deriving an electrical signal in accordance with the relative tilt of the vertical gyro rotor and its support about one axis; a third means for deriving an electrical signal in accordance with the relative tilt of the vertical gyro rotor and its support about a second axis; means connected to said deriving means for combining said three signals; and means operated by said combining means for moving said directional gyro rotor in accordance with the net effect of said signals.

17. A directional gyroscope having an outer gimbal ring rotatably supported; a gimbal ring member pivotally supported on said outer ring; a gyro rotor pivoted in said ring member about an axis at right angles to said pivotal support; means for deriving a first signal upon relative movement of said ring member and said outer ring; a resolver or signal pickup means operated in accordance with the extent of rotation of said outer gimbal ring and its support; a vertical gyroscope; means operated by said vertical gyro for deriving a second signal in accordance with the tilt of the vertical gyroscope about its transverse axis; means for deriving in said pickup means a proportion of said second signal depending on the angular relation of the axis of tilt and of said directional gyro operated pickup; and means controlled by said first signal and the derived portion of said second signal and arranged to place said ring member in a desired position.

18. A directional gyroscope having a rotor supported for universal movement; a first means for deriving an electrical signal in accordance with the relative tilt of the rotor and its support about one axis; a vertical gyroscope supported for universal movement; a second means for deriving an electrical signal in accordance with the relative tilt of the vertical gyro rotor and its support about one axis; a third means for deriving an electrical signal in accordance with the relative tilt of the vertical gyro rotor and its support about a second axis; means connected to said deriving means for combining said three signals; means operated by said combining means for moving said directional gyro rotor in accordance with the net effects of said combination signal; and manually operable means for controlling said combining means for changing the relative position of said directional gyroscope rotor and its support.

19. Control apparatus comprising: a gyroscope; means for deriving a signal in response to the movement of said gyroscope rotor about one axis other than its spin axis; a second gyroscope; a controller having a rotor and a stator the rotor thereof being connected to said second gyroscope and operated thereby upon movement of the gyroscope rotor about an axis other than its spin axis; connections from said signal deriving means to said stator; and power means connected to said controller rotor and controlled thereby for precessing said second gyroscope.

20. In a dirigible craft, in combination: a directional gyroscope having an outer pivoted gimbal ring; means for rotatably supporting its rotor about a horizontal axis; means for pivotally mounting said rotor supporting means in said outer ring about a horizontal axis perpendicular to said first axis, so that as said craft changes heading said outer ring rotates about its pivot; means for generating a first signal upon movement of said rotor supporting means about said pivotal mounting should said craft roll as it changes heading; means positioned in accordance with the direction of gravity for generating a second signal in proportion to said roll, and means connected to said generators and controlled by said first and second signals for maintaining said rotor perpendicular to the direction of gravity during said pivotal movement of said outer ring.

21. In combination; a neutrally mounted free directional gyroscope having a rotor tiltable about an axis; a vertical gyroscope having a rotor tiltable about two horizontal axes; and means jointly controlled by the tilting of the directional gyro rotor and the tilting of the vertical gyro rotor about said two horizontal axes for governing the position of said directional gyro rotor.

OSCAR HUGO SCHUCK.

REFERENCES CITED

The following references are of record in the file of this patent:

UNITED STATES PATENTS

| Number | Name | Date |
| --- | --- | --- |
| 1,136,566 | Usener | Apr. 20, 1915 |
| 1,335,055 | Hedenstrom | Mar. 30, 1920 |
| 1,465,532 | Sundhaussen | Aug. 21, 1923 |
| 2,197,890 | Koster | Apr. 23, 1940 |
| 2,412,614 | Haskings et al. | Dec. 17, 1946 |
| 2,414,448 | Carter | Jan. 21, 1947 |
| 2,417,689 | Johnson | Mar. 18, 1947 |
| 2,497,614 | Libman | Feb. 14, 1950 |